US011344042B2

(12) United States Patent
Lisinenko et al.

(10) Patent No.: US 11,344,042 B2
(45) Date of Patent: May 31, 2022

(54) METHOD FOR PRODUCING A ROSEBAY WILLOWHERB BEVERAGE WITH A HIGH GAMMA-AMINOBUTYRIC ACID CONTENT

(71) Applicant: MAY LLC, Moskovskoy obi., g. Fryazino (RU)

(72) Inventors: Igor Vasilyevich Lisinenko, Moscow (RU); Irina Nikolaevna Lisinenko, Moscow (RU)

(73) Assignee: MAY LLC, Moskovskoy obl., g. Fryazino (RU)

( * ) Notice: Subject to any disclaimer, the term of this patent is extended or adjusted under 35 U.S.C. 154(b) by 0 days.

(21) Appl. No.: 17/295,981

(22) PCT Filed: Dec. 13, 2019

(86) PCT No.: PCT/RU2019/000946
§ 371 (c)(1),
(2) Date: May 21, 2021

(87) PCT Pub. No.: WO2021/006758
PCT Pub. Date: Jan. 14, 2021

(65) Prior Publication Data
US 2021/0352929 A1 Nov. 18, 2021

(30) Foreign Application Priority Data
Aug. 7, 2019 (RU) .......................... RU2019121335

(51) Int. Cl.
*A23F 3/34* (2006.01)
*A23F 3/16* (2006.01)
*A23F 3/24* (2006.01)

(52) U.S. Cl.
CPC ............... *A23F 3/34* (2013.01); *A23F 3/166* (2013.01); *A23F 3/24* (2013.01)

(58) Field of Classification Search
CPC ............... A23F 3/34; A23F 3/166; A23F 3/24
See application file for complete search history.

(56) References Cited

U.S. PATENT DOCUMENTS

| 2008/0057162 A1* | 3/2008 | Brucker | ................ A23L 33/105 426/73 |
| 2016/0255854 A1* | 9/2016 | Rousseau | .................. A23F 3/34 |

FOREIGN PATENT DOCUMENTS

| CN | 102613352 A | * | 8/2012 |
| CN | 103005020 A | | 4/2013 |
| CN | 103766531 A | * | 5/2014 |
| CN | 106173078 A | * | 12/2016 |
| KR | 2016096964 A | | 8/2016 |
| RU | 2095994 C1 | | 11/1997 |
| RU | 2124843 C1 | | 1/1999 |
| RU | 2226059 C2 | | 3/2004 |

* cited by examiner

*Primary Examiner* — Tamra L. Dicus
(74) *Attorney, Agent, or Firm* — Nadya Reingand; Yan Hankin

(57) ABSTRACT

A method for producing herbal beverages and beverages from rosebay willowherb which have a high content of biologically active substances, particularly gamma-aminobutyric acid (GABA), is disclosed. The method consists in freezing a raw material consisting of rosebay willowherb leaves at a temperature of from −45° C. to 0° C. or cooling the same to a temperature below dewpoint, then heating the raw material to a temperature of 15-25° C. and subsequently grinding it to produce a homogeneous plant mass, treating the resulting plant mass with an aqueous solution of vitamin B6 and with an aqueous suspension of glutamic acid and subsequently fermenting the mass at 22-40° C. for 2-10 hours, then carrying out drying to produce a finished product.

1 Claim, No Drawings

METHOD FOR PRODUCING A ROSEBAY WILLOWHERB BEVERAGE WITH A HIGH GAMMA-AMINOBUTYRIC ACID CONTENT

TECHNICAL FIELD OF THE INVENTION

The invention relates to the food industry and, particularly, to a method for producing herbal beverages and rosebay willowherb beverages which have a high content of biologically active substances, namely gamma-aminobutyric acid (GABA).

BACKGROUND OF THE INVENTION

There is currently a variety of methods for increasing a content of biologically active substances in plant raw materials.

A common method for increasing a content of target compounds in products made of plant raw materials consists in adding the compounds in the form of a powder or in an encapsulated form to the bulk of the product.

The disadvantage of the above-indicated method is that it is impossible to achieve uniform dosage (mixing or stirring) of the bulk of the product and small amounts of the powder of biologically active substances. If biological substances in the form of capsules are added to the product, the capsules are separated from the bulk of the product during packaging and transportation, thereby increasing the risk of overdose or non-compliance of the product with its declared characteristics.

RU2018119010 discloses a method for producing rosebay willowherb tea having an enhanced biological value due to an increased content of GABA, vitamin B6 and alanine in a final product. The method allows for the production of GABA and alanine directly in the product during the fermentation of rosebay willowherb tea leaves by controlling the conditions of the fermentation of plant raw materials, as well as by controlling the temperature, humidity, atmospheric composition and execution time of the method. The method includes the steps of treating the rosebay willowherb leaves with a solution of vitamin B6, performing a two-stage fermentation for 1-6 hours at a temperature of 31-50° C., and drying the product to a residual moisture content.

The disadvantage of the method known from RU2018119010 is a low GABA content in the final product, which is caused by the low content of a GABA precursor (glutamic acid) in the raw materials itself. To solve this problem, the two-stage fermentation is performed in the method, which however leads to an increase in labor costs.

SUMMARY OF THE INVENTION

The technical problem to be solved by the present invention lies in the development of a simple, easy-to-use method for producing rosebay willowherb tea that has a high content of biologically active substances, i.e. gamma-aminobutyric acid, and is devoid of the aforementioned prior art disadvantages.

The technical result achieved when implementing the present invention consists in simplifying the method for producing rosebay willowherb tea, while significantly increasing the GABA content in a final product.

The above-indicated technical result is achieved by the fact that the method for producing rosebay willowherb beverage having a high GABA content comprises: freezing a raw material comprising rosebay willowherb leaves at a temperature of from −45° C. to 0° C. (hereinafter referred to as the range of freezing temperatures) or cooling (but not freezing) the same to a temperature below a dewpoint under the conditions of harvesting the fresh rosebay willowherb leaves (hereinafter referred to as the range of cooling temperatures); then heating the raw material up to a temperature of 15-25° C.; subsequently grinding the raw material to produce a homogeneous plant mass; treating the resulting plant mass with an aqueous solution of vitamin B6 in an amount of 0.10-0.25 g of vitamin B6 per 1 kg of the plant mass and with an aqueous suspension of glutamic acid or a solution of a sodium or potassium or magnesium or calcium or ammonium or lithium or zinc salt of glutamic acid in an amount of 6.4-10.6 g of glutamic acid or one of said salts per 1 kg of the plant mass; further, fermenting the plant mass at 22-40° C. for 2-10 hours; and performing a drying process to produce a final product. The content of vitamin B6 in the solution added is 0.5%-1%, and the content of glutamic acid in the suspension or the content of the salt of glutamic acid in the solution is 5% or 20-25%, respectively.

Said grinding comprises cutting the raw material in a grinder and then putting it through a mincing machine.

The solution of vitamin B6 is prepared by dissolving vitamin B6 in solid form in water, namely 0.10-0.25 g of vitamin B6 in water.

The dewpoint is known to be a temperature to which air should be cooled down in order for an airborne vapor to reach saturation and begin to condense into dew. The dewpoint is determined by a relative air humidity. The higher the relative air humidity, the higher the dewpoint and the closer it is to an actual air temperature. The lower the relative air humidity, the lower the dewpoint compared to the actual air temperature. If the relative air humidity is 100%, the dewpoint is the same as the actual air temperature.

For example, the dewpoint temperature is +1.9° C. at the relative air humidity of 50% and the air temperature of 12° C., while the dewpoint temperature is +12° C. at the relative air humidity of 68% and the air temperature of 18° C.

The suspension of glutamic acid or the solution of the salt of glutamic acid is prepared by suspending or dissolving a solid in water, namely 6.4-10.6 g of glutamic acid or the salt of glutamic acid in water.

The fermentation process may be performed in a container with no exposure to light, which makes it possible to reduce the degree of activation of alternative enzymatic complexes that take place in the presence of direct illumination and compete with the target process. Thus, by performing the fermentation process with no exposure to light, it is possible to additionally increase the yield of the final GABA product during the fermentation process.

Said drying the final product is performed at 30-55° C. for 6-12 hours until a final moisture content is reached. At this temperature, the product with a maximum GABA content is obtained. At the same time, it has been found that an increase in the drying temperature above 55° C. leads to a decrease in the GABA content.

By performing the present method under the above-indicated technological modes, it is possible to achieve a high GABA content in the final product.

It has been found that the temperature stress created by: pre-freezing the rosebay willowherb leaves to a temperature falling within the range of freezing temperatures or by cooling them to a temperature falling within the range of cooling temperatures, then heating them up to a room temperature of 15-25° C., as well as adding the 0.5%-1% solution of vitamin B6 in the amount of 0.10-0.25 g of vitamin B6 per 1 kg of the plant mass and the 5% aqueous suspension of glutamic acid or the 20%-25% aqueous solution of the sodium or potassium or magnesium or calcium or ammonium or lithium or zinc salt of glutamic acid in the amount of 6.4-10.6 g of glutamic acid or one of said salts per 1 kg of the plant mass to the grinded plant mass, —mutually stimulates a significant increase in the activity of glutamate decarboxylase, i.e. a natural enzyme that catalyzes the formation of GABA from the salts of glutamic acid or glutamic acid itself, in the raw material. The creation of the temperature stress in concert with the addition of the active components (B6 solutions, the salt of glutamic acid, or the suspension of glutamic acid) in the above-indicated ratios and concentrations appears to lead to a significantly enhanced effect due to the occurrence of a synergistic effect (i.e. the increased activity of glutamate decarboxylase in the raw material).

This leads to an increase in the rate and efficiency of GABA synthesis in the plant mass and the fermentation process as a whole. As a result, the labor intensity of the method is decreased without having to perform multistage fermentation to obtain an increased GABA content in the mass, thereby significantly simplifying the method for producing the rosebay willowherb beverage.

During our experiments, it was found that the addition of glutamic acid or some (sodium or potassium or magnesium or calcium or ammonium or lithium or zinc) salts of glutamic acid in the amount of 6.4-10.6 g of glutamic acid or one of said salts per 1 kg of the plant mass to the rosebay willowherb leaf, which had been frozen or cooled, re-heated up to the room temperature and mechanically treated without using the conventional technology of withering, rolling and fermentation, allows glutamic acid or the (sodium or potassium or magnesium or calcium or ammonium or lithium or zinc) salt of glutamic acid to be converted into GABA by using a single one-stage natural fermentation process, thereby simplifying the method and reducing its labor intensity.

According to the standard process of rosebay willowherb leaf fermentation, GABA accumulation in the plant mass is limited by the low content of free glutamic acid, which is involved in the GABA synthesis. During the fermentation, glutamic acid is released from proteins, but this process is long and accompanied by a decrease in the activity of the GABA-producing enzyme, thereby leading to an increase in the execution time of the process and to a product with a low GABA content.

However, the authors have found that, in addition to the action of vitamin B6, the cooling-heating cycle of the raw material intensifies the GABA synthesis from glutamic acid or the salts of glutamic acid during the fermentation process, resulting in an increase in the yield of GABA in the final product.

Furthermore, the efficiency of the GABA synthesis during the fermentation process is revealed to depend on the amount of the additives introduced into the plant mass: vitamin B6 and glutamic acid or the salt of glutamic acid. In particular, it has been shown that when the 0.5-1% solution of vitamin B6 and the 5% aqueous suspension of glutamic acid or the 20-25% solution of the (sodium or potassium or magnesium or ammonium or lithium or zinc) salt of glutamic acid in the amount of 0.1-0.25 g of vitamin B6 and 6.4-10.6 g of glutamic acid or the salt of glutamic acid per 1 kg of the raw material, respectively, is added to the plant mass, the yield of GABA in the final product increases (up to 3 g of GABA per 100 g of the dry product), which is likely to be caused by the occurrence of the synergistic effect.

At the same time, it should be noted that when the solutions of vitamin B6 and the aqueous suspension of glutamic acid or the solution of the salt of glutamic acid are introduced in the above-indicated amounts into the plant mass, the residual content of glutamic acid or the residual content of the salt of glutamic acid at the end of the fermentation process does not exceed similar values for other rosebay willowherb beverages, including those rosebay willowherb beverages which are obtained by using any other known fermentation methods.

While grinding the raw material, it is not allowed to overheat the raw material above 25-30° C. because of a possible decrease in the activity of the enzyme due to its temperature denaturation.

DETAILED DESCRIPTION OF THE INVENTION

The essence of the present method is explained below with reference to Examples 1-34.

Example 1

1 kg of fresh rosebay willowherb leaves frozen at a temperature of −18° C. is heated up to a room temperature (22° C.), held at the room temperature for 40 minutes. Next, the heated leaves are cut in a grinder and put through a mincing machine. 50 g of a 0.5% solution of vitamin B6 (to prepare the solution, 0.25 g of vitamin B6 was weighed) and 53 g of a 20% sodium glutamate solution (to prepare the solution, 10.6 g of the salt were weighed) are added to the resulting mass and stirred, and a fermentation process is performed at 40° C. in a reactor with no exposure to light. Upon the expiry of 4 hours, the fermented plant mass is removed from the reactor, and the resulting product is dried at 45° C. for 6 hours until a final moisture content of 5% is reached.

Example 2

1 kg of fresh rosebay willowherb leaves frozen at a temperature of −45° C. is defrosted and held at a room temperature (25° C.) for 30 minutes. Next, the heated leaves are cut in the grinder and put through the mincing machine. 22.2 g of a 0.9% solution of vitamin B6 (to prepare the solution, 0.20 g of vitamin B6 was weighted) and 42.7 g of a 22% solution of potassium glutamate (to prepare the solution, 9.4 g of the salt were weighted) are added to the resulting mass and stirred, and the fermentation process is performed at 40° C. in the reactor with no exposure to light. Upon the expiry of 6 hours, the fermented plant mass is removed from the reactor, and the resulting product is dried at 40° C. for 8 hours until the final moisture content of 5% is reached.

Example 3

1 kg of fresh rosebay willowherb leaves frozen at a temperature of −12° C. is defrosted and held at a room temperature (23° C.) for 30 minutes. Next, the leaves are cut in the grinder and put through the mincing machine. 10 g of a 1% solution of vitamin B6 (to prepare the solution, 0.1 g of vitamin B6 was weighted) and 25.6 g of a 25% solution of magnesium glutamate (to prepare the solution, 6.4 g of the salt were weighted) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 40° C. for 6 hours until the final moisture content is reached.

Example 4

1 kg of fresh rosebay willowherb leaves frozen at a temperature of −14° C. is defrosted and held at a room temperature (25° C.) for 35 minutes. Next, the leaves are cut in the grinder and put through the mincing machine. 12 g of a 1% solution of vitamin B6 (to prepare the solution, 0.12 g of vitamin B6 was weighted) and 35 g of a 20% solution of calcium glutamate (to prepare solution, 7 g of the salt were weighted) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 45° C. for 7 hours until the final moisture content is reached.

Example 5

1 kg of fresh rosebay willowherb leaves frozen at a temperature of −15° C. is held at this temperature for 4 hours, heated up to a room temperature (20° C.), held at the room temperature for 40 minutes. Next, the heated leaves are cut in the grinder and then put through the mincing machine. 24 g of a 0.7% solution of vitamin B6 (to prepare the solution, 0.17 g of vitamin B6 was weighed) and 35.2 g of a 23% solution of ammonium glutamate (to prepare the solution, 8.1 g of the salt were weighed) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 6

1 kg of fresh rosebay willowherb leaves cooled down to a temperature of +4° C. (at an air temperature of +25° C., a relative humidity of 65%, a dewpoint temperature of +18° C.) is held for 4 hours, heated up to a room temperature (25° C.), held at the room temperature for 30 minutes. Next, the heated leaves are cut in the grinder and put through the mincing machine. 50 g of a 0.5% solution of vitamin B6 (to prepare the solution, 0.25 g of vitamin B6 was weighed) and 50 g of a 20% solution of lithium glutamate (to prepare the solution, 10 g of the salt were weighed) are added to the resulting mass and stirred, and the fermentation process is performed at 40° C. in the reactor with no exposure to light. Upon the expiry of 7 hours, the fermented plant mass is removed from the reactor, and the resulting product is dried at 55° C. for 6 hours until the final moisture content of 5% is reached.

Example 7

1 kg of fresh rosebay willowherb leaves cooled down to a temperature of +2° C. (at an air temperature of +23° C., a relative humidity of 55%, a dewpoint temperature of +13.5° C.) is held for 4 hours, heated up to a room temperature (23° C.), held at the room temperature for 30 min. Next, the heated leaves are cut in the grinder and put through the mincing machine. 22.2 g of a 0.9% solution of vitamin B6 (to prepare the solution, 0.20 g of vitamin B6 was weighted) and 43.2 g of a 22% solution of zinc glutamate (to prepare the solution, 9.5 g of the salt were weighted) are added to the resulting mass and stirred, and the fermentation process is performed at 40° C. in the reactor with no exposure to light. Upon the expiry of 6 hours, the fermented plant mass is removed from the reactor, and the resulting product is dried at 40° C. for 7 hours until the final moisture content of 5% is reached.

Example 8

1 kg of fresh rosebay willowherb leaves cooled down to a temperature of +4° C. (at an air temperature of +24° C., a relative humidity of 75%, a dewpoint temperature of +19.3° C.) is held for 4 hours, heated up to a room temperature (24° C.), held at the room temperature for 35 min. Next, the leaves are cut in the grinder and put through the mincing machine. 11 g of a 1% solution of vitamin B6 (to prepare the solution, 0.11 g of vitamin B6 was weighted) and 136 g of a 5% suspension of glutamic acid (to prepare the suspension, 6.8 g of the acid were weighted) are added to the resulting mass, and the fermentation process is performed at 35° C. for 8 hours in the reactor with no exposure to light when stirring the mixture. Upon the expiry of 8 hours, the fermented plant mass is removed from the reactor, and the resulting product is dried at 42° C. for 8 hours until the final moisture content is reached.

Example 9

1 kg of fresh rosebay willowherb leaves cooled down to a temperature of +2° C. (at an air temperature of +20° C., a relative humidity of 50%, a dewpoint temperature of +9.2° C.) is held for 4 hours, heated up to a room temperature, held at the room temperature (20° C.) for 50 min. Next, the leaves are cut in the grinder and put through the mincing machine. 12 g of a 1% solution of vitamin B6 (to prepare the solution, 0.12 g of vitamin B6 was weighted) and 36 g of a 20% solution of calcium glutamate (to prepare the solution, 7.2 g of the salt were weighted) are added to the resulting mass and stirred, and the fermentation process is performed at 40° C. for 8 hours in the reactor with no exposure to light. Upon the expiry of 8 hours, the fermented plant mass is removed from the reactor, and the resulting product is dried at 45° C. for 6 hours until the final moisture content is reached.

Example 10

1 kg of fresh rosebay willowherb leaves cooled down to a temperature of +2° C. (at an air temperature of +15° C., a relative humidity of 65%, a dewpoint temperature of +8.5° C.) is held for 3 hours, heated up to a room temperature (15° C.), held at the room temperature for 45 min. Next, the heated leaves are cut in the grinder and then put through the mincing machine. 24 g of a 0.7% solution of vitamin B6 (to prepare the solution, 0.17 g of vitamin B6 was weighed) and 37 g of a 23% solution of ammonium glutamate (to prepare the solution, 8.51 g of the salt were weighed) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 11

1 kg of fresh rosebay willowherb leaves stored at a room temperature (23° C.), is cut in the grinder and put through the mincing machine. 10 g of a 1% solution of vitamin B6 (to prepare the solution, 0.1 g of vitamin B6 was weighted) and 25.6 g of a 25% solution of magnesium glutamate (to prepare the solution, 6.4 g of the salt were weighted) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 40° C. for 6 hours until the final moisture content is reached.

Example 12

1 kg of fresh rosebay willowherb leaves frozen at a temperature of −14° C. is defrosted and held at a room temperature (25° C.) for 35 minutes. Next, the leaves are cut in the grinder and put through the mincing machine. 12 g of a 1% solution of vitamin B6 (to prepare the solution, 0.12 g of vitamin B6 was weighted) and 78.9 g of a 19% solution of calcium glutamate (to prepare the solution, 15 g of the salt were weighed) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 45° C. for 7 hours until the final moisture content is reached.

Example 13

1 kg of fresh rosebay willowherb leaves frozen at a temperature of −14° C. is defrosted and held at a room temperature (25° C.) for 35 minutes. Next, the leaves are cut in the grinder and put through the mincing machine. 12 g of a 1% solution of vitamin B6 (to prepare the solution, 0.12 g of vitamin B6 was weighted) and 15.4 g of a 26% solution of calcium glutamate (to prepare the solution, 4 g of the salt were weighed) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 45° C. for 7 hours until the final moisture content is reached.

Example 14

1 kg of fresh rosebay willowherb leaves frozen at a temperature of −15° C. is held at this temperature for 4 hours, heated up to a room temperature (20° C.), held at the room temperature for 40 minutes. Next, the heated leaves are cut in the grinder and then put through the mincing machine. 6 g of a 1.5% solution of vitamin B6 (to prepare the solution, 0.09 g of vitamin B6 was weighted) and 35.2 g of a 23% solution of ammonium glutamate (to prepare the solution, 8.1 g of the salt were weighted) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 15

1 kg of fresh rosebay willowherb leaves frozen at a temperature of −15° C. is held at this temperature for 4 hours, heated up to a room temperature (20° C.), held at the room temperature for 40 minutes. Next, the heated leaves are cut in the grinder and then put through the mincing machine. 125 g of a 0.4% solution of vitamin B6 (to prepare the solution, 0.09 g of vitamin B6 was weighed) and 35.2 g of a 23% solution of ammonium glutamate (to prepare the solution, 8.1 g of the salt were weighed) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 16

1 kg of rosebay willowherb leaves frozen at −46° C. is defrosted, held for 1 hour, after which they are heated up to a temperature of 30° C. The heated leaves are immediately cut in the grinder and then put through the mincing machine. The resulting mass is fermented at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 17

1 kg of rosebay willowherb leaves frozen at −18° C. is defrosted, held for 1 hour, after which they are heated up to a temperature of 20° C. The heated leaves are immediately cut in the grinder and then put through the mincing machine. The resulting mass is fermented at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 18

1 kg of fresh leaves stored at a temperature of 20° C. is cut in the grinder and then put through the mincing machine. The resulting mass is fermented at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 19

1 kg of rosebay willowherb leaves frozen at −50° C. is defrosted, held for 1 hour, after which they are heated up to a temperature of 30° C. The heated leaves are immediately cut in the grinder and then put through the mincing machine. 24 g of a 0.7% solution of vitamin B6 (to prepare the solution, 0.17 g of vitamin B6 was weighed) and 35.2 g of a 23% solution of ammonium glutamate (to the prepare the solution, 8.1 g of the salt were weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 20

1 kg of rosebay willowherb leaves frozen at −50° C. is defrosted, held for 1 hour, after which they are heated up to a temperature of 14° C. The heated leaves are immediately cut in the grinder and then put through the mincing machine. 6 g of a 1.5% solution of vitamin B6 (to prepare the solution, 0.09 g of vitamin B6 was weighed) and 78.9 g of a 19% solution of magnesium glutamate (to prepare the solution, 15 g of the salt were weighed) are added to the resulting mass and stirred, and the fermentation process is performed at 45° C. for 12 hours in the reactor with no exposure to light. Upon the expiry of 12 hours, the fermented plant mass is removed from the reactor and the resulting product is dried at 30° C. for 10 hours until the final moisture content is reached.

Example 21

1 kg of rosebay willowherb leaves frozen at −18° C. is defrosted, after which they are heated up to a temperature of 23° C., the raw material is held at this temperature for 30 minutes. Next, the heated leaves are cut in the grinder and then put through the mincing machine. 125 g of a 0.4% solution of vitamin B6 (to prepare the solution, 0.5 g of vitamin B6 was weighed) and 15.4 g of a 26% solution of calcium glutamate (to prepare the solution, 4 g of the salt were weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 22

1 kg of rosebay willowherb leaves cooled down to a temperature of 1.8° C. (under the following conditions: a relative humidity of 50%, an air temperature of 12° C. (a dewpoint temperature of +1, 9° C.)) is heated up to a temperature of 30° C. The heated leaves are immediately cut in the grinder and then put through the mincing machine, and the fermentation process is performed at 45° C. for 10 hours in the reactor with no exposure to light. Upon the expiry of 10 hours, the fermented plant mass is removed from the reactor, and the resulting product is dried at 30° C. for 10 hours until the final moisture content is reached.

Example 23

1 kg of rosebay willowherb leaves frozen at −46° C. is defrosted, held for 1 hour, after which they are heated up to a temperature of 2° C. (under the following conditions: a relative humidity of 50%, an air temperature of 12° C. (a dewpoint temperature of +1, 9° C.)). The heated leaves are immediately cut in the grinder and then put through the mincing machine. 6 g of a 1.5% solution of vitamin B6 (to prepare the solution, 0.09 g of vitamin B6 was weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 24

1 kg of rosebay willowherb leaves frozen at −46° C. is defrosted, held for 1 hour, after which they are heated up to a temperature of 30° C. The heated leaves are immediately cut in the grinder and then put through the mincing machine. 24 g of a 0.7% solution of vitamin B6 (to prepare the solution, 0.17 g of vitamin B6 was weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 25

1 kg of rosebay willowherb leaves frozen at −46° C. is defrosted, held for 1 hour, after which they are heated up to a temperature of 30° C. The heated leaves are immediately cut in the grinder and then put through the mincing machine. 78.9 g of a 19% zinc glutamate solution (to prepare the solution, 15 g of the salt were weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 26

1 kg of rosebay willowherb leaves frozen at −46° C. is defrosted, held for 1 hour, after which they are heated up to a temperature of 30° C. The heated leaves are immediately cut in the grinder and then put through the mincing machine. 35.2 g of a 23% solution of lithium glutamate (to prepare the solution, 8.1 g of the salt were weighted) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 27

1 kg of rosebay willowherb leaves frozen at −15° C. is defrosted, held for 1 hour, after which they are heated up to a temperature of 15° C. The heated leaves are immediately cut in the grinder and then put through the mincing machine. 6 g of a 1.5% solution of vitamin B6 (to prepare the solution, 0.09 g of vitamin B6 was weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 28

1 kg of rosebay willowherb leaves frozen at −15° C. is defrosted, held for 1 hour, after which they are heated up to a temperature of 15° C. The heated leaves are immediately cut in the grinder and then put through the mincing machine. 24 g of a 0.7% solution of vitamin B6 (to prepare the solution, 0.17 g of vitamin B6 was weighed) are added to the resulting mass and stirred, and the fermentation process is performed at 45° C. for 12 hours in the reactor with no exposure to light. Upon the expiry of 12 hours, the fermented plant mass is removed from the reactor, and the resulting product is dried at 30° C. for 10 hours until the final moisture content is reached.

Example 29

1 kg of fresh rosebay willowherb leaves frozen at −18° C. is held at this temperature for 4 hours, heated up to a room temperature (20° C.), held at the room temperature for 40 minutes. Next, the heated leaves are cut in the grinder and then put through the mincing machine. 24 g of a 0.7% solution of vitamin B6 (to prepare the solution, 0.17 g of vitamin B6 was weighted) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 30

1 kg of fresh rosebay willowherb leaves frozen at a temperature of −10° C. is held at this temperature for 4 h, heated up to a room temperature (20° C.), held at the room temperature for 40 minutes. Next, the heated leaves are cut in the grinder and then put through the mincing machine. 50 g of a 0.5% solution of vitamin B6 (to prepare the solution, 0.25 g of vitamin B6 was weighted) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 31

1 kg of fresh rosebay willowherb leaves cooled down to a temperature of 4° C. is held at this temperature for 4 hours, heated up to a room temperature (20° C.), held at the room temperature for 40 minutes. Next, the heated leaves are cut in the grinder and then put through the mincing machine. 12 g of a 1% solution of vitamin B6 (to prepare the solution, 0.12 g of vitamin B6 was weighted) are added to the resulting mass and stirred, and the fermentation process is performed at 30° C. for 10 hours in the reactor with no exposure to light. Upon the expiry of 10 hours, the fermented plant mass is removed from the reactor, and the resulting product is dried at 35° C. for 12 hours until the final moisture content is reached.

Example 32

1 kg of fresh rosebay willowherb leaves frozen at a temperature of −14° C. is defrosted and held at a room temperature (25° C.) for 35 minutes. Next, the leaves are cut in the grinder and put through the mincing machine. 35 g of a 20% solution of calcium glutamate (to prepare the solution, 7 g of the salt were weighted) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 45° C. for 7 hours until the final moisture content is reached.

Example 33

1 kg of fresh rosebay willowherb leaves frozen at a temperature of −14° C. is defrosted and held at a room temperature (25° C.) for 35 minutes. Next, the leaves are cut in the grinder and put through the mincing machine. 136 g of a 5% suspension of glutamic acid (to prepare the solution, 6.8 g of the acid was weighed) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 45° C. for 7 hours until the final moisture content is reached.

Example 34

1 kg of fresh rosebay willowherb leaves is cooled down to 4° C., held for 4 hours, after which they are heated up to a room temperature (20° C.), held at the room temperature for 30 minutes. Next, the leaves are cut in the grinder and put through the mincing machine. 35.2 g of a 23% solution of ammonium glutamate (to prepare the solution, 8.1 g of the salt were weighed) are added to the resulting mass and stirred, and the fermentation process is performed at 35° C. for 8 hours in the reactor with no exposure to light. Upon the expiry of 8 hours, the fermented plant mass is removed from the reactor, and the resulting product is dried at 45° C. for 7 hours until the final moisture content is reached.

| Example No. | GABA amount (g) in 100 g of final product |
| --- | --- |
| Example 1 | 3.0 |
| Example 2 | 1.7 |
| Example 3 | 2.5 |
| Example 4 | 1.8 |
| Example 5 | 1.9 |
| Example 6 | 2.8 |
| Example 7 | 1.5 |
| Example 8 | 2.6 |
| Example 9 | 2.6 |
| Example 10 | 2.3 |
| Example 11 | 0.35 |
| Example 12 | 0.5 |
| Example 13 | 0.4 |
| Example 14 | 0.37 |
| Example 15 | 0.38 |
| Example 16 | 0.4 |
| Example 17 | 0.42 |
| Example 18 | 0.4 |
| Example 19 | 1.4 |
| Example 20 | 0.5 |
| Example 21 | 0.3 |
| Example 22 | 0.45 |
| Example 23 | 0.49 |
| Example 24 | 1.3 |
| Example 25 | 0.42 |
| Example 26 | 1.4 |
| Example 27 | 0.44 |
| Example 28 | 1.3 |
| Example 29 | 1.3 |
| Example 30 | 1.4 |
| Example 31 | 1.4 |
| Example 32 | 1.4 |
| Example 33 | 1.4 |
| Example 34 | 1.4 |

It has been experimentally found that the technical result is achieved by pre-freezing the rosebay willowherb leaves directly to a temperature falling within the range of freezing temperatures or by pre-cooling the rosebay willowherb leaves directly to a temperature falling within the range of cooling temperatures, and subsequently heating them directly to 15−+25° C. When the temperature stress created by cooling and subsequently heating the leaves is in any other temperature ranges, the GABA content in the product is found to be significantly decreased.

Thus, the easy-to-use method for producing rosebay willowherb tea with a high content of natural GABA has been developed, in which GABA is obtained naturally in the bulk of the product itself by using the natural enzyme of rosebay willowherb, i.e. glutamate decarboxylase. The resulting product comprises GABA in amounts of up to 3 g/100 g of dry product, which is 3 times higher than the content of GABA in a similar product obtained by the method described in RU2018119010.

What is claimed is:

1. A method for producing rosebay willowherb tea beverage having a gamma-aminobutyric acid (GABA) content, comprising:

freezing a first raw material comprising rosebay willowherb leaves at a temperature of from −45° C. to 0° C. or cooling the first raw material to a temperature below a dewpoint to produce a first raw material plant mass;

heating the first raw material plant mass up to a temperature of 15-25° C. to produce a second raw material plant mass;

grinding the second raw material plant mass to produce a third raw material plant mass;

treating the third raw material plant mass with an aqueous solution of vitamin B6 in an amount of 0.10-0.25 g of vitamin B6 per 1 kg of the third raw material plant mass and additionally treating with either an aqueous suspension of glutamic acid in an amount of 6.4-10.6 g of glutamic acid per 1 kg of the third raw material plant mass or a salt of glutamic acid solution selected from a group consisting of: a sodium, potassium, magnesium, calcium, ammonium, lithium, and zinc salt of glutamic acid in an amount of 6.4-10.6 g of one of said sodium, potassium, magnesium, calcium, ammonium, lithium and zinc salts per 1 kg of the third raw material plant mass to produce a fourth raw material plant mass;

fermenting the plant mass at 22-40° C. for 2-10 hours to produce a fifth raw material plant mass; and drying the fifth raw material plant mass at 30-55° C. for 6-12 hours to produce a final product, wherein a content of vitamin B6 in the aqueous solution of vitamin B6 is 0.5%-1% in mass percentage, and a content of glutamic acid in the aqueous suspension of glutamic acid is 5% in mass percentage, and a content of the salt of glutamic acid in the aqueous suspension is 20-25% in mass percentage.

* * * * *